US012749213B1

(12) United States Patent
George et al.

(10) Patent No.: US 12,749,213 B1
(45) Date of Patent: Sep. 29, 2026

(54) SYSTEMS AND METHODS FOR DETECTING AND DISPLAYING FISHING ACTIVITY

(71) Applicant: Brunswick Corporation, Mettawa, IL (US)

(72) Inventors: Trevor George, Savoy, IL (US); Kyle A. Walters, Kalamazoo, MI (US)

(73) Assignee: Brunswick Corporation, Mettawa, IL (US)

( * ) Notice: Subject to any disclaimer, the term of this patent is extended or adjusted under 35 U.S.C. 154(b) by 300 days.

(21) Appl. No.: 18/218,447

(22) Filed: Jul. 5, 2023

Related U.S. Application Data

(60) Provisional application No. 63/392,312, filed on Jul. 26, 2022, provisional application No. 63/358,658, filed on Jul. 6, 2022.

(51) Int. Cl.
*G06T 7/70* (2017.01)
*G06T 7/521* (2017.01)
*G06T 7/593* (2017.01)

(52) U.S. Cl.
CPC ................ *G06T 7/70* (2017.01); *G06T 7/521* (2017.01); *G06T 7/593* (2017.01); *G06T 2207/10012* (2013.01)

(58) Field of Classification Search
CPC ........... G06T 7/70; G06T 7/521; G06T 7/593; G06T 2207/10012
See application file for complete search history.

(56) References Cited

U.S. PATENT DOCUMENTS

| | | | | |
|---|---|---|---|---|
| 6,583,728 | B1 | 6/2003 | Staerzl | |
| 7,150,664 | B1 | 12/2006 | Uppgard et al. | |
| 7,156,709 | B1 | 1/2007 | Staerzl et al. | |
| 7,255,616 | B1 | 8/2007 | Caldwell | |
| 7,416,456 | B1 | 8/2008 | Gonring et al. | |
| 7,441,189 | B2 | 10/2008 | Michaels | |
| 7,467,595 | B1 | 12/2008 | Lanyi et al. | |
| 7,924,164 | B1 | 4/2011 | Staerzl | |
| 9,737,757 | B1 * | 8/2017 | Kiraly ................ | A63B 24/0021 |
| 10,259,555 | B2 | 4/2019 | Ward et al. | |
| 10,372,976 | B2 | 8/2019 | Kollmann et al. | |
| 10,429,845 | B2 | 10/2019 | Arbuckle et al. | |
| 2015/0019586 | A1 * | 1/2015 | Raichelgauz .......... | H04H 60/66 707/769 |

(Continued)

FOREIGN PATENT DOCUMENTS

| | | | |
|---|---|---|---|
| CN | 108605907 | * | 1/2021 |
| CN | 202010050955 | * | 3/2021 |

OTHER PUBLICATIONS

Machine translation of Zhang CN-202010050955, 2021.*
Wada et al. Visualizing the drift of fishing gear using drone. (Year: 2017).*

*Primary Examiner* — John B Strege
(74) *Attorney, Agent, or Firm* — Andrus Intellectual Property Law, LLP

(57) ABSTRACT

A system for assisting a user fishing with fishing gear. The system includes an image sensor configured to capture imaging data of the fishing gear. A control system is configured to analyze the imaging data of the fishing gear to detect fishing activity. A notification device is operatively coupled to the control system and configured to notify the user when the fishing activity is detected.

19 Claims, 9 Drawing Sheets

(56) References Cited

U.S. PATENT DOCUMENTS

| | | | | |
|---|---|---|---|---|
| 2019/0066517 | A1 * | 2/2019 | Neser | H04N 7/04 |
| 2020/0160726 | A1 | 5/2020 | Malouf et al. | |
| 2020/0202719 | A1 | 6/2020 | Derginer et al. | |
| 2021/0383124 | A1 * | 12/2021 | Imes | G06V 10/82 |
| 2023/0372023 | A1 * | 11/2023 | Fernando | A61B 90/36 |

* cited by examiner

SYSTEMS AND METHODS FOR DETECTING AND DISPLAYING FISHING ACTIVITY

CROSS REFERENCE TO RELATED APPLICATION

This application claims the benefit of U.S. Provisional Patent Application No. 63/358,658, filed Jul. 6, 2022, and U.S. Provisional Patent Application No. 63/392,312, filed Jul. 26, 2022, which are incorporated herein by reference in its entirety.

FIELD

The present disclosure generally relates to systems and methods for detecting fishing activity and notifying a user when the fishing activity is detected.

BACKGROUND

The following are incorporated by reference in entirety.

U.S. Pat. No. 11,443,637 discloses a proximity sensor system on a marine vessel that includes one or more proximity sensors, each at a sensor location on the marine vessel and configured to measure proximity of objects and generate proximity measurements. A processor is configured to store a two-dimensional vessel outline of the marine vessel with respect to a point of navigation for the marine vessel, receive the proximity measurements measured by one or more proximity sensors on the marine vessel, and identify four linearly-closest proximity measurements to the two-dimensional vessel outline, including one closest proximity measurement in each of a positive X direction, a negative X direction, a positive Y direction, and a negative Y direction. The processor then generates a most important object (MIO) dataset identifying the four linearly-closest proximity measurements.

U.S. Pat. No. 11,373,537 discloses a method of controlling propulsion of a marine vessel that includes receiving proximity measurements from one or more proximity sensors on the marine vessel and limiting user input authority over propulsion output in a direction of an object by at least one propulsion device based on the proximity measurement so as to maintain the marine vessel at least a buffer distance from the object. The method further includes suspending maintenance of the buffer distance from the object in response to a user-generated instruction. Then, when user control input is received via a user input device to move the marine vessel in the direction of the object, the at least one propulsion device is controlled based on the user control input such that the marine vessel approaches and impacts the object.

U.S. Pat. No. 10,429,845 discloses a method for controlling a position of a marine vessel near a target location includes measuring a present location of the marine vessel, and based on the vessel's present location, determining if the marine vessel is within a predetermined range of the target location. The disclosure further describes examples of proximity and vision-based sensors provided at the bow, stern, port and/or starboard sides of the marine vessel, including radars, sonars, LiDAR devices, cameras, lasers, Doppler direction finders, or other devices individually capable of determining both the relative location and distance to an object O near the marine vessel 1, such as a dock, seawall, slip, buoy, shoreline, large rock or tree, etc. In some embodiments, the proximity sensors are RFID receivers and RFID tags can be placed on the object O at strategic positions. In other embodiments, the RFID receivers may instead be radio frequency identification and geometry (RFIG) units, which determine location, poise, motion, and orientation information using photovoltaic components and IR-LEDs on the receiver's integrated circuit. The vision-based sensors can be cameras. A control module can be programmed with a computer vision algorithm that allows it to interpret photographs or video from the cameras.

U.S. Pat. No. 10,372,976 discloses an object detection system for a marine vessel having at least one marine drive, which includes at least one image sensor positioned on the marine vessel and is configured to capture an image of a marine environment on or around the marine vessel, and a processor. The object detection system further includes an image scanning module executable on the processor that receives the image as input. The image scanning module includes an artificial neural network trained to detect patterns within the image of the marine environment associated with one or more predefined objects, and to output detection information regarding a presence or absence of the one or more predefined objects within the image of the marine environment.

U.S. Pat. No. 10,259,555 discloses a method for controlling movement of a marine vessel near an object, which includes accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

U.S. Pat. No. 7,924,164 discloses a detection system that senses the location of a preselected color within one or more monitored zones of a machine tool. If the operator of a machine tool wears a red glove, the system detects the location of the color red and defines various monitored zones through the use of synchronization signals and a time circuit. The system can take action based on the location of the particular monitored zones in which the red glove is sensed. These actions can include the sounding of a horn, the lighting of a light, or the deactivation of the machine tool.

U.S. Pat. No. 7,441,189 discloses a method of producing an instrumentation interface for a vehicle having a display device, which may include initializing a display format for the instrumentation interface in accordance with one or more characteristics of the vehicle. The method may further include collecting customization data to configure a display site defined by the display format of the instrumentation interface, and generating the instrumentation interface via the display device in accordance with the display format and the customization data for the display site.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One aspect of the present disclosure generally relates to a system for assisting a user fishing with fishing gear. The system includes an image sensor configured to capture imaging data of the fishing gear. A control system is configured to analyze the imaging data of the fishing gear to detect fishing activity. A notification device is operatively coupled to the control system and configured to notify the user when the fishing activity is detected.

In certain examples, the image sensor comprises a stereo-vision camera.

In certain examples, the image sensor is positioned within a marine vessel configured to be situated in water, wherein the image sensor is configured to capture the imaging data of the fishing gear when the fishing gear is in the water. In further examples, the image sensor is a first image sensor, and the system further includes a second image sensor positioned within the marine vessel and configured to capture imaging data of the fishing gear out of the water.

In certain examples, the image sensor is configured to detect a distance to the fishing gear, and wherein the fishing activity is detected when the distance to the fishing gear changes. In further examples, the image sensor comprises a LIDAR device. In further examples, the image sensor is a plurality of image sensors comprising a stereo-vision camera and a LIDAR device each configured to capture the imaging data of the fishing gear.

In certain examples, the image sensor is positioned within a marine vessel configured to be situated in water, wherein the fishing gear comprises planar boards, the system further including a memory system storing preset positions for the planar boards to be positioned in the water, respectively, wherein the control system is further configured to determine actual positions for the planar boards in the water and to compare the actual positions to the preset positions, wherein the fishing activity is determined for each of the planar boards based on the comparison of the actual position to the preset position corresponding thereto.

In certain examples, the fishing gear comprises a fishing pole, wherein the control system is configured to analyze the imaging data captured by the image sensor to detect an angle of the fishing pole and to compare the angle of the fishing pole to a threshold, and wherein the fishing activity is detected when the angle of the fishing pole exceeds the threshold.

In certain examples, the control system is configured to communicate with an external wireless device and to receive additional information regarding the fishing gear and/or fish caught with the fishing gear from the external wireless device, wherein the additional information comprises at least one of a type of lure, a preset position for positioning the fishing gear, an indication that a fish was caught, and a size of a fish that was caught.

Other aspects according to the present disclosure generally relate to methods for assisting a user fishing with fishing gear. In certain examples, the method includes capturing imaging data of the fishing gear via an image sensor and analyzing the imaging data to determine a position of the fishing gear. The method further includes monitoring the position of the fishing gear to detect fishing activity and notifying the user when the fishing activity is detected.

In certain examples, the image sensor is positioned in a marine vessel situated in water, wherein the fishing gear is a planar board, and wherein the fishing activity is detected based on the position of the planar board in the water outside the marine vessel.

In certain examples, the fishing gear is a planar board having a flag, wherein the position of the fishing gear comprises a position of the flag, and wherein the fishing activity is detected based on whether the position of the flag is determined to be down.

In certain examples, analyzing the imaging data includes determining a distance to the fishing gear, and wherein the fishing activity is detected when the distance to the fishing gear is determined to have changed. In further examples, the method further includes comparing a change in the distance to the fishing gear to a threshold, and wherein the fishing activity is detected when the change exceeds the threshold.

In certain examples, the fishing gear includes a fishing pole, wherein the position of the fishing gear comprises an angle in which the fishing pole is bent, and wherein the fishing activity is detected when the angle in which the fishing pole is exceeds a threshold.

In certain examples, the position of the fishing gear comprises a position of the fishing gear in water, further comprising comparing the position of the fishing gear in water to a preset position for the fishing gear to be in the water, wherein the fishing activity is detected when the actual position differs from the preset position.

In certain examples, the fishing gear comprises a fishing lure, further comprising recording when a fish is caught and the fishing lure used to catch the fish.

In certain examples, the fishing gear comprises a plurality of fishing poles arranged in an order, and wherein the fishing activity is detected by determining that the order of the plurality of the fishing poles has changed.

In certain examples, the fishing gear comprises a plurality of fishing poles, further comprising analyzing the imaging data to determine which of the plurality of fishing poles are in-use fishing, and further comprising displaying which of the plurality of fishing poles are in-use fishing.

Other aspects according to the present disclosure relate to a system for assisting a user fishing from a marine vessel with fishing gear. The system includes a stereo-vision camera positioned within the marine vessel and configured to capture imaging data of the fishing gear when the fishing gear is outside the marine vessel. A control system is operatively coupled to the stereo-vision camera and configured to analyze the imaging data of the fishing gear to detect fishing activity. A display device is operatively coupled to the control system and configured to generate an indication when the fishing activity is detected to thereby assist the user in fishing.

Other aspects according to the present disclosure relate to an image system on a marine vessel for determining characteristics of a fish. An image sensor is positioned on the marine vessel and configured to image a fish and to generate imaging data based thereon. A control system is configured to determine characteristics of the fish based on the imaging data, wherein the characteristics include at least one dimension of the fish, and wherein the control system is configured to display the characteristics of the fish on a display device.

In certain examples, the characteristics include an estimated weight of the fish, wherein the control system is further configured to determine the estimated weight of the fish based on the at least one dimension of the fish.

In certain examples, the image sensor is a plurality of visual image sensors configured as a stereo-vision system.

In certain examples, the image sensor is configured to generate the imaging data of the fish when the fish is onboard the marine vessel.

In certain examples, the at least one dimension of the fish is a length of the fish between a head and a tail. In further examples, the characteristics further include a girth of the fish between a back and an underside. In further examples, the girth is a plurality of girths determined at a plurality of positions along the length of the fish. In further examples, the control system is further configured to compare the length and the plurality of girths to determine a shape of the fish. In further examples, the image system further includes a model accessible by the control system, wherein the control system is further configured to compare the length and the plurality of girths of the fish to the model to identify a type of fish.

In certain examples, the characteristics include a coloration of the fish, wherein the control system is further configured to determine a species of the fish based on the coloration.

In certain examples, the control system is further configured to store a digital representation of the fish in memory along with the characteristics determined for the fish. In further examples, the control system is further configured to identify unique markings of the fish from the image data, and wherein the digital representation includes the unique markings of the fish. In further examples, the control panel is configured to store additional information along with the digital representation of the fish, wherein the additional information includes at least one of a date, a time, and a weather condition corresponding to when the imaging data was generated for the fish. In further examples, the control system is further configured to receive information regarding a lure used to catch the fish, wherein the control panel is configured to store additional information along with the digital representation of the fish, wherein the additional information includes the information regarding the lure.

In certain examples, the control system is further configured to communicate the characteristics determined for the fish and to compare the characteristics with other characteristics determined for other fish.

It should be recognized that the different aspects described throughout this disclosure may be combined in different manners, including those than expressly disclosed in the provided examples, while still constituting an invention accord to the present disclosure.

Various other features, objects and advantages of the disclosure will be made apparent from the following description taken together with the drawings.

BRIEF DESCRIPTION OF THE DRAWINGS

The present disclosure is described with reference to the following FIGURES.

DETAILED DISCLOSURE

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible.

Figure 1:
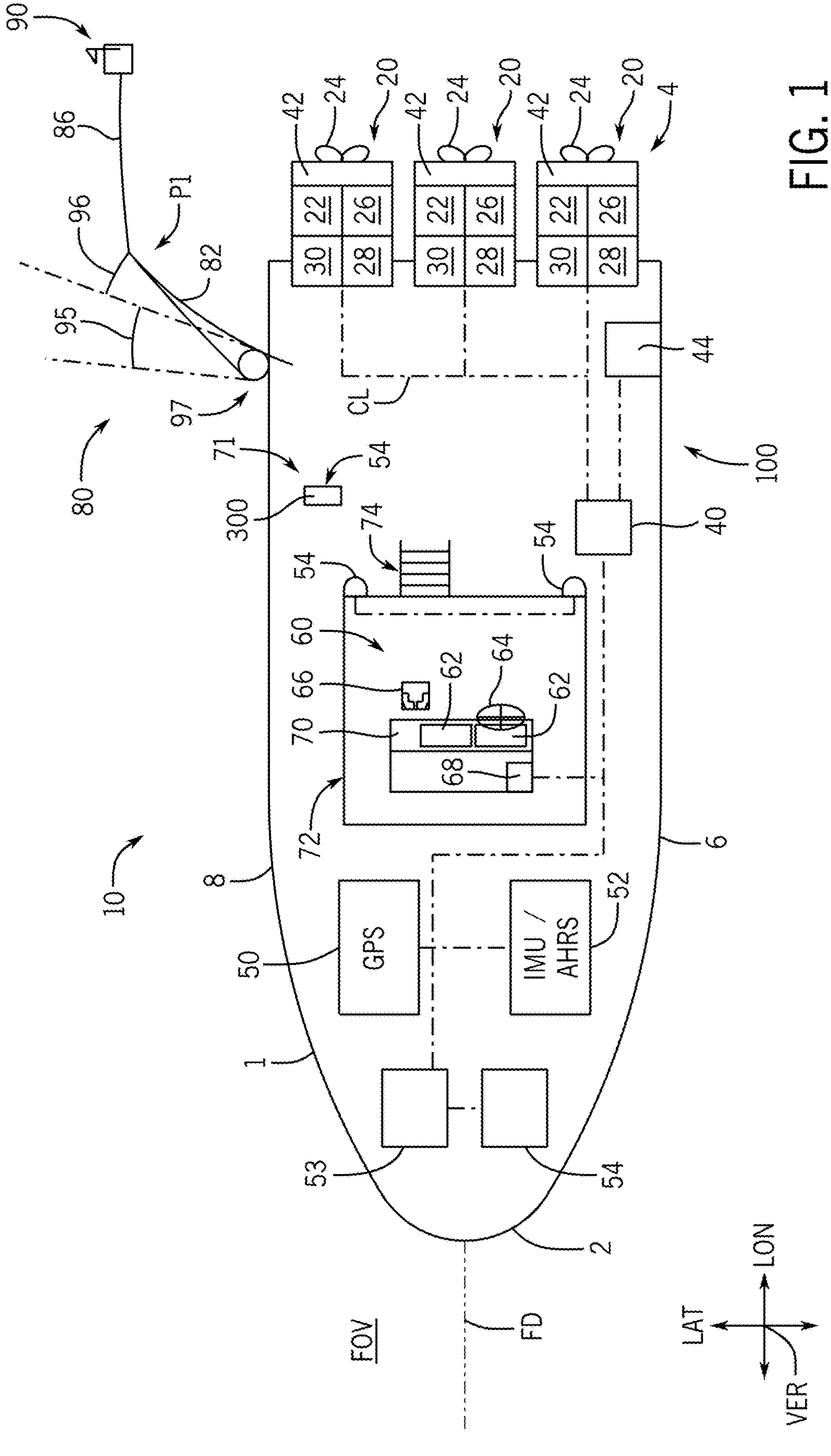
FIG. 1 is a top view of a marine vessel incorporating one embodiment of system for detecting and displaying fishing activity according to the present disclosure.

FIG. 1 shows a system 10 for assisting a user fishing with fishing gear according to the present disclosure, in this case configured for fishing from a marine vessel 1. The marine vessel 1 extends between a bow 2 and a stern 4 along a longitudinal axis LON, and between a port side 6 and starboard side 8 along a latitudinal axis LAT perpendicular to the longitudinal direction LON (each also being perpendicular to the vertical axis VER). The marine vessel 1 is propelled through the water by a plurality of marine propulsion devices 20, which while shown as outboard motors could instead be inboard motors, stern drives, pod drives, and/or jet drives. Each marine propulsion device 20 includes a powerhead 22. The powerheads 22 may be internal combustion engines (e.g., gasoline or diesel engines), electric motors, and/or a hybrid thereof. Each marine propulsion device 20 in FIG. 1 also includes a propeller 24 coupled in torque-transmitting relationship with a respective powerhead 22 so as to generate propulsion in the water.

The marine propulsion devices 20 further include powerhead speed sensors 26 measuring a speed of a respective powerhead 22 (or an output shaft thereof). In one example, the powerhead speed sensors 26 may be shaft rotational speed sensors (e.g., Hall-Effect sensors), which measure a speed of the powerhead 22 in rotations per minute (RPM) in a manner known in the art.

Each marine propulsion device 20 is further provided with steering actuators 28 configured to steer the marine propulsion devices 20, respectively, in accordance with commands from a steering device as discussed further below. The steering actuators 28 may operate as a "steer by wire" system rather than including physical linkages between the marine propulsion devices 20 and steering input devices (e.g., a steering wheel). The steering actuators 28 include steering angle sensors therein, which provide feedback regarding the steering angle of the corresponding marine propulsion device 20 in a manner known in the art. The steering actuators 28 may be mechanically, hydraulically, pneumatically, and/or electromechanically operated. Additional information regarding exemplary steering actuators is provided in U.S. Pat. Nos. 7,150,664; 7,255,616; and 7,467,595, which are incorporated by reference herein.

Similarly, each marine propulsion device 20 is provided with a trim actuator 30 configured to adjust the trim angle of these devices in a manner known in the art. The trim actuators 30 include steering angle sensors therein, which provide feedback regarding the trim angle of the corresponding marine propulsion device 20 in a manner known in the art. The trim actuators 30 may be hydraulically, pneumatically, and/or electromechanically operated. Additional information regarding exemplary trim actuators is provided in U.S. Pat. Nos. 6,583,728; 7,156,709; 7,416,456; and 9,359,057, which are incorporated by reference herein.

With continued reference to FIG. 1, a central control module 40 (or CCM) is provided in signal communication with the powerheads 22, as well as being in signal communication with the associated sensors and other components noted herein below. In certain examples, the central control module 40 communicates with propulsion control modules 42 (or PCMs) and/or other control devices associated with each of the marine propulsion devices 20 in a manner known in the art. Although FIG. 1 shows one central control module 40, it will be recognized that more than one central control module may work together serially and/or in parallel, such as one central control module for each of the marine propulsion devices 20.

Power is provided to the marine vessel 1 via a power system 44, which may include batteries and/or other energy storage systems known in the art. The power system 44 provides power to the central control module 40 and propulsion control modules 42, as well as to other components associated with the marine propulsion devices 20 or marine vessel 1 more generally, as discussed further below. One such additional component powered by the power system 44 is a global positioning system (GPS) 50 that provides location and speed of the marine vessel 1 to the central control module 40. Additionally, or alternatively, a vessel speed sensor such as a Pitot tube or a paddle wheel could be provided to detect the speed of the marine vessel 1. The marine vessel 1 may also include an inertial measurement unit (IMU) or an attitude and heading reference system (AHRS) (collectively shown as the IMU/AHRS 52). An IMU has a solid state, rate gyro electronic compass that indicates the vessel heading and solid-state accelerometers and angular rate sensors that sense the vessel's attitude and rate of turn. An AHRS provides 3D orientation of the marine vessel 1 by integrating gyroscopic measurements, accelerometer data, and magnetometer data. The IMU/AHRS 52 could be GPS-enabled, in which case a separate GPS 50 would not be required.

The marine vessel 1 of FIG. 1 includes a helm 60 having a dashboard 70 with a number of operator input devices for controlling various functions of the system 10 and the marine vessel 1 more generally. The helm 60 of this marine vessel 1 is raised, specifically being positioned on a tower 72 above a cabin so as to improve visibility and increase space for the deck 71 and the cabin under the tower 72. A ladder 74 is provided for moving between the helm 60 and the deck 71.

With continued reference to FIG. 1, the operator input devices at the helm 60 include a multi-functional display device 62 including a user interface, which may be an interactive, touch-capable display screen, a keypad, a display screen and keypad combination, a track ball and display screen combination, and/or any other type of user interface known in the art. The operator input devices further include one or more steering devices, such as a steering wheel 64 and/or a joystick, configured to facilitate user input (e.g., via the central control module 40, the propulsion control modules 42, and/or a helm control module 68 in a manner known in the art) for steering the marine vessel 1.

A throttle lever 66 is also provided as an operator input device for providing thrust commands, including both a magnitude and a direction of thrust, to the central control module 40. By way of example, rotating the throttle lever 66 in a forward direction away from its neutral, detent position could be interpreted as a value from 0% to 100% operator demand corresponding via an input/output map, such as a look up table, to a position of the throttle valves of the powerheads 22. For example, the input/output map might dictate that the throttle valves are fully closed when the throttle lever 66 is in the forward, detent position (i.e., 0% demand), and are fully open when the throttle lever 66 is pushed forward to its furthest extent (i.e., 100% demand). As discussed further below, similar methods may also be employed for controlling steering, whereby operator inputs are received from a range of −100% to +100% corresponding to full port and full starboard steering directions, which then cause corresponding steering of the marine propulsion devices 20, in certain examples through the use of a lookup table.

Figure 2:
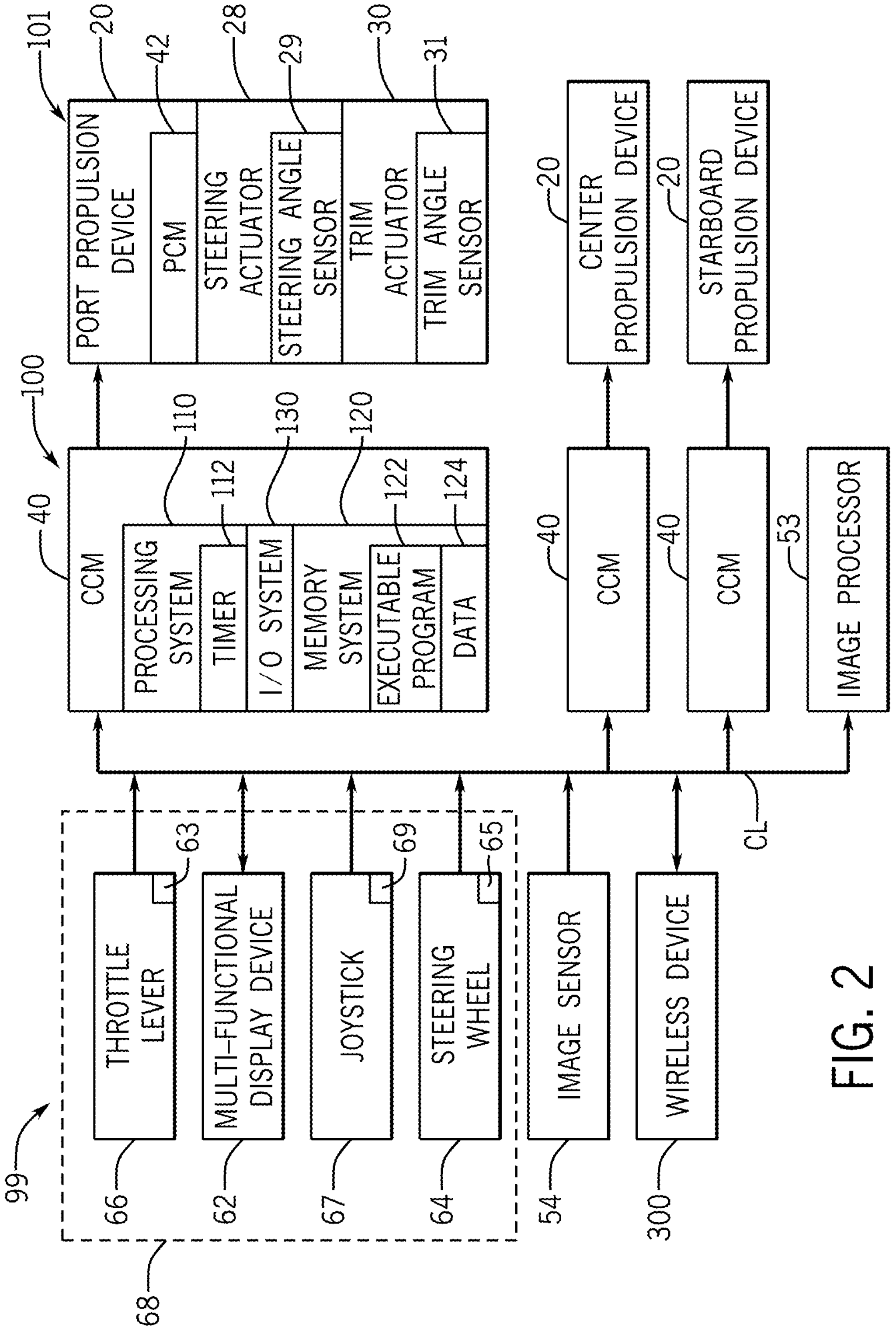
FIG. 2 is schematic view of a control system such as may be incorporated within the marine vessel of FIG. 1.

Additional information is now provided for subsystems within an exemplary control system 100, which includes one or more central control modules 40, one or more propulsion control modules 42, the helm control module 68, an image processor 53 (discussed below), and/or other controllers, as shown in FIG. 2. A person of ordinary skill in the art will recognize that these subsystems may also be present within additional central control modules 40 (as applicable) and/or propulsion control modules 42 or other controllers within the marine vessel 1. In the example shown, each central control module 40 includes a processing system 110, which may be implemented as a single microprocessor or other circuitry, or be distributed across multiple processing devices or sub-systems that cooperate to execute the executable program 122 from the memory system 120. Non-limiting examples of the processing system include general purpose central processing units, application specific processors, and logic devices.

Each central control module 40 further includes a memory system 120, which may comprise any storage media readable by the processing system 110 and capable of storing the executable program 122 and/or data 124. The memory system 120 may be implemented as a single storage device or be distributed across multiple storage devices or subsystems that cooperate to store computer readable instructions, data structures, program modules, or other data. The memory system 120 may include volatile and/or non-volatile systems and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example. An input/output (I/O) system 130 provides communication between the control system 100 and peripheral devices, such as input devices 99 and output devices 101, which are discussed further below. In practice, the processing system 110 loads and executes an executable program 122 from the memory system 120, accesses data 124 stored within the memory system 120, and directs the system 10 to operate as described in further detail below.

A person of ordinary skill in the art will recognize that these subsystems within the control system 100 may be implemented in hardware and/or software that carries out a programmed set of instructions. As used herein, the term "central control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A central control module may include memory (shared, dedicated, or group) that stores code executed by the processing system. The term "code" may include software, firmware, and/or microcode, and may refer to programs, routines, functions, classes, and/or objects. The term "shared" means that some or all code from multiple central control modules may be executed using a single (shared) processor. In addition, some or all code from multiple central control modules may be stored by a single (shared) memory. The term "group" means that some or all code from a single central control module may be executed using a group of processors. In addition, some or all code from a single central control module may be stored using a group of memories. As shown in FIG. 2, one or more central control module 40 may together constitute a control system 100. The one or more central control modules 40 can be located anywhere on the marine vessel 1.

A person of ordinary skill in the art will understand in light of the disclosure that the control system 100 may include a differing set of one or more control modules, or control devices, which may include engine control modules (ECMs) or propulsion control modules 42 for each marine propulsion device 20 (which, when applicable, may be referred to as ECMs even if the marine propulsion device 20 contains an electric motor in addition to or in place of an internal combustion engine), one or more thrust vector control modules (TVMs), one or more helm control modules (HCMs), and/or the like. Likewise, certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, lookup tables, or the like, configured to carry out a variety of functions under the control of one or more processors or other control devices.

The control system 100 communicates with each of the one or more components of the marine vessel 1 via a communication link CL, which can be any wired or wireless link. The illustrated communication link CL connections between functional and logical block components are merely exemplary, which may be direct or indirect, and may follow alternate pathways. The control system 100 is capable of receiving information and/or controlling one or more operational characteristics of the marine vessel 1 and its various sub-systems by sending and receiving control signals via the communication links CL. In one example, the communication link CL is a controller area network (CAN) bus; however, other types of links could be used. It will be recognized that the extent of connections and the communication links CL may in fact be one or more shared connections, or links, among some or all of the components in the marine vessel 1. Moreover, the communication link CL lines are meant only to demonstrate that the various control elements are capable of communicating with one another, and do not represent actual wiring connections between the various elements, nor do they represent the only paths of communication between the elements. Additionally, the marine vessel 1 may incorporate various types of communication devices and systems, and thus the illustrated communication links CL may in fact represent various different types of wireless and/or wired data communication systems.

As will be discussed further below, the control system 100 communicates with input devices 99 from various components such as steering devices, for example via sensors 63, 65, and 69 that detect the positions of the throttle lever 66, the steering wheel 64, and/or a joystick 67, respectively. The control system 100 also communicates with other input devices, such as trim tab control devices, the multi-functional display device 62, the GPS 50, the IMU/AHRS 52, and/or image sensors 54 (discussed further below).

The control system 100 also communicates with output devices 101 such as propulsion control modules 42, steering actuators 28, and trim actuators 30, for example. It will be recognized that the arrows shown are merely exemplary and that communication may flow in multiple directions. For example, the steering angle sensors 29 and trim angle sensors 31, while shown as corresponding to the steering actuators 28 and trim actuators 30, may serve as input devices 99 feeding into the one or more central command modules 40.

Figure 4:
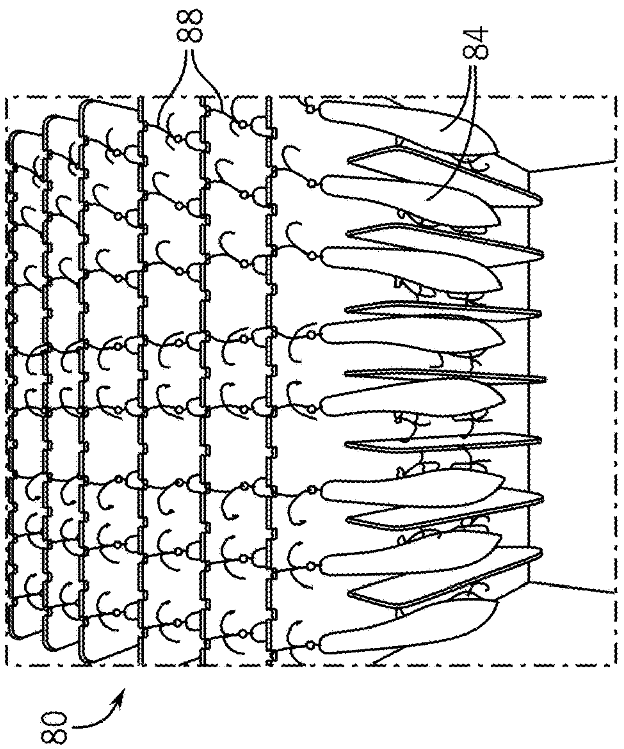
FIG. 4 shows examples of fishing gear usable with a system like that of FIG. 1.
Figure 3:
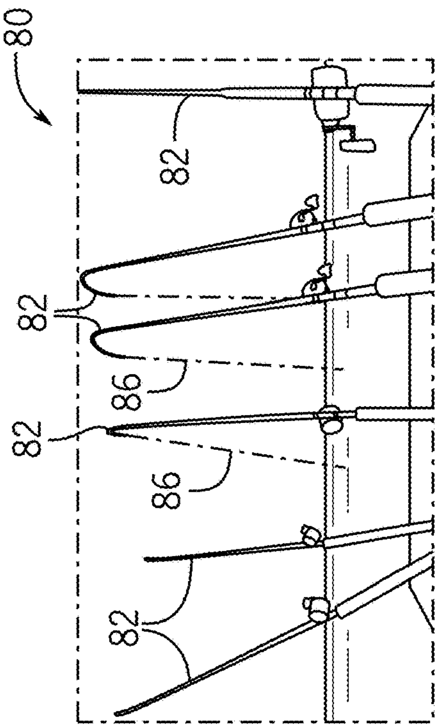
FIG. 3 shows examples of fishing gear usable with a system like that of FIG. 1.

Through experimentation and development, the present inventors have identified problems with respect to a marine vessel operator being required to perform many tasks simultaneously while underway. In the case of a fishing charter, the operator must not only safely navigate the waters, such as trolling along a given depth contour, but must also assist clients as needs arise, set up and deploy fishing gear, and monitor that fishing gear (e.g., detecting when a fish is on, snagging of the lines, and/or other problems). With reference to FIGS. 3 and 4, a typical setup of fishing gear 80 includes multiple fishing poles 82 each having a lure 84 with a hook 88 (in some cases with bait attached thereto) connected to the fishing pole 82 via a line 86. Different types of poles 82 may be available onboard the marine vessel and operators are known to carry dozens of different types of lures 84. The lures 84 may vary in size, shape, color, iridescence, hook number, hook size, hook configuration, or factors having differences in appearance or function in the water.

To improve the success rate of fishing, an operator also carefully selects which particular lures to deploy at any given time, and optimally tries to keep track of the success rate of one lure over another. The depth and type of bait may also vary. Furthermore, it is common that many fishing poles will be used on a single marine vessel at the same time. These fishing poles may also use different lures, depths, and/or bait, and the arrangement of the fishing poles relative to each other may change over time. Accordingly, accurately tracking the success rate of these many variables is effectively impossible, particularly as variables may change when the operator is busy tending to other tasks, such as driving (e.g., a client may move a pole, a fish may temporarily bite a line, etc.).

Figure 5:
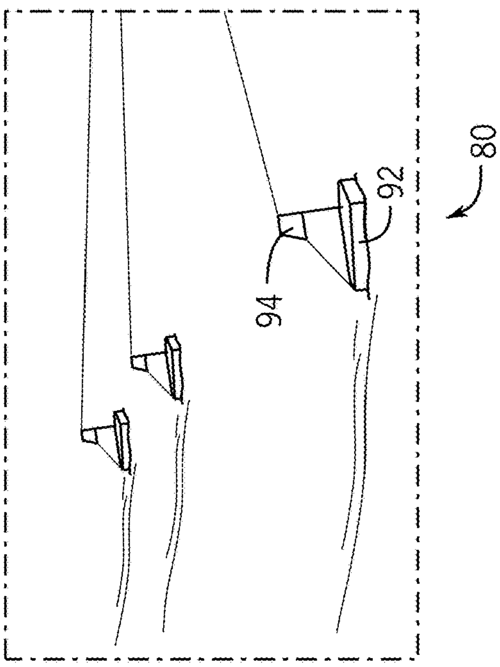
FIG. 5 shows examples of fishing gear usable with a system like that of FIG. 1.
Figure 6:
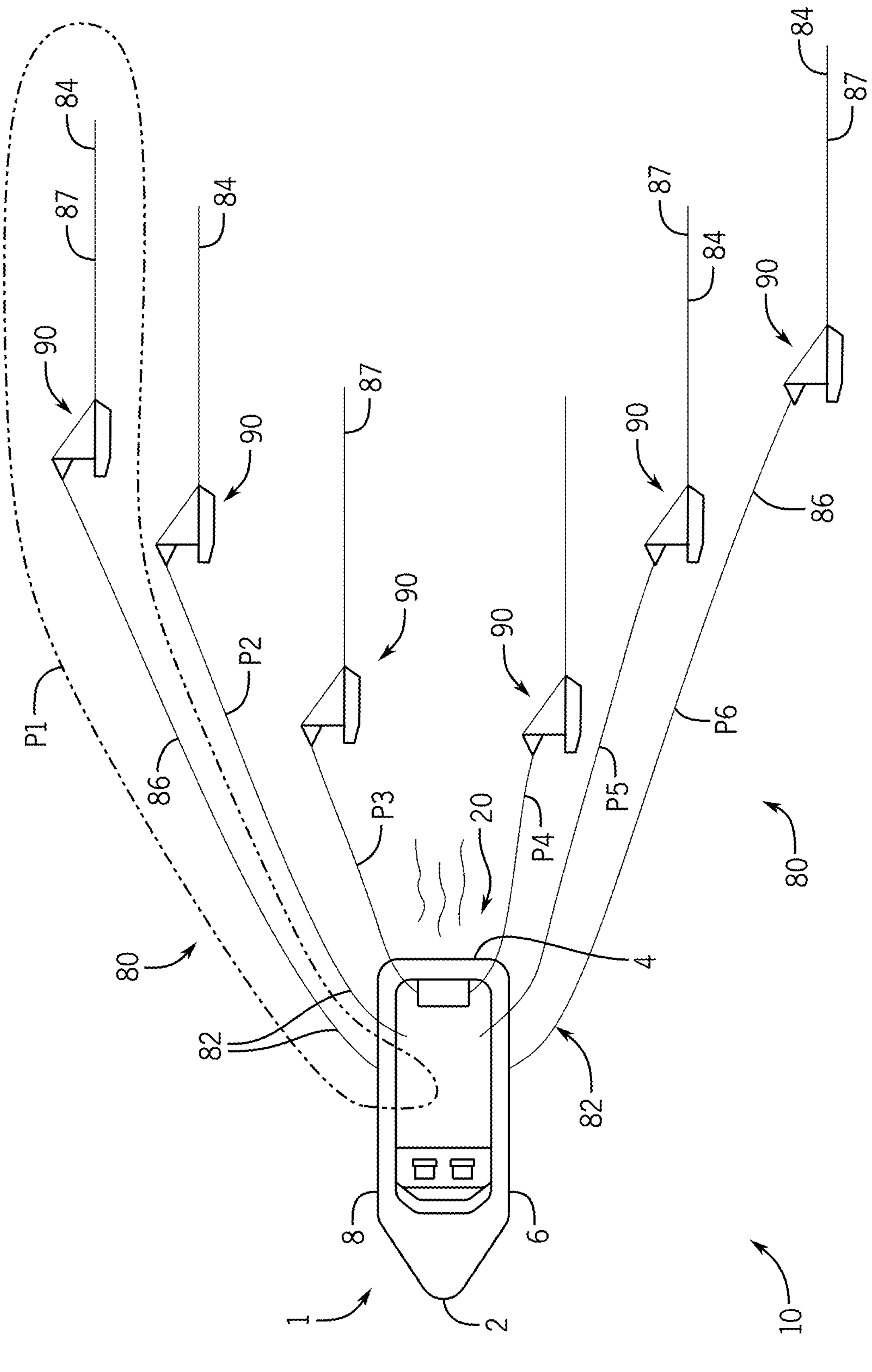
FIG. 6 shows a marine vessel like that of FIG. 1 with fishing gear in use.

The fishing gear 80 also varies depending on the type of fish being pursued. As shown in FIGS. 5 and 6, planar boards 90 are commonly used in conjunction with walleye fishing. Each planar board 90 has a body 92 that floats on the water, as well as a flag 94. The planar board 90 is connected to the fishing pole 82 (FIG. 3) via the line 86, whereby another line 87 then extends from the planar board to the lure 84. Different lengths of line 86 are let out from each of the fishing poles 82 based on the position of the fishing poles 82 in the marine vessel 1, and to ensure that the lines 86, 87 do not tangle with those of other fishing poles 82. The planar boards 90 are designed such that the flag 94 drops when a fish is on the line, serving as a visual indicator.

However, as discussed above, it is very challenging for the operator of the marine vessel 1 to also monitor the status of the fishing gear 80 in use, including the status of the planar boards 90. Additionally, it is not uncommon for a flag 94 to drop only momentarily before popping back up. If the operator is not paying enough attention, and at that precise moment, they may not notice the fish on. Likewise, on occasion the flag 94 does not drop and the body 92, which once again makes it difficult if not impossible to identify that a fish or weed is on the line. In certain cases, the added weight of a fish or weeds on the line cause the planar board 90 to drift aftwardly (e.g., from an original position, such as from a line formed by the planar boards 90 in positions P1 to P3 in FIG. 6). However, this may be too subtle to notice, and/or may occur very slowly.

In view of these unmet problems, the present disclosure provides for systems and methods for detecting fishing activity, thereby aiding the operator. Returning to FIG. 1, the system 10 includes an object detection system having one or more image sensors 54 and an image processor 53. The image sensors 54 capture imaging data (also sometimes referred to simply as capturing images) relating to objects and/or the environment on or around the marine vessel 1, including fishing gear 80. Examples of image sensors 54 include proximity and/or vision-based sensors such as radars, sonars, LiDAR devices, cameras and/or stereo-vision cameras, lasers, and/or Doppler direction finders. It should be recognized that stereo-vision is not limited to any particular type of image sensors or packaging thereof. By way of example, one device may include two or more image sensors 54 specifically configured to provide stereo-vision in a single housing or package. Alternatively, stereo-vision can be provided via processing data collected from the image sensors 54 of two more devices that are spaced apart from each other (each device having at least one image sensor 54, including having multiple image sensors 54 to themselves be configured to provide stereo-vision). Separate image sensors 54 may be provided for capturing objects that are on or in the marine vessel 1 versus those for capturing objects outside the marine vessel 1 (e.g., in the water surrounding the marine vessel). The image sensors 54 may also vary in type, field of view, focal distance (e.g., corresponding to distances both inside and outside the marine vessel), or mounting location on the marine vessel 1 accordingly.

Likewise, image sensors 54 may be positioned in different locations on the marine vessel 1 but having overlapping fields of view. In this overlapping configuration, data from multiple image sensors 54 may be processed together so as to provide redundancy, provide views of a same object from different angles, and/or to enable improve the accuracy of calculating distances (e.g., through triangulation techniques known in the art for processing imaging data or images from two or more cameras). Overlapping fields of views may also be used to ensure that the entire deck 71 or area of interest outside the marine vessel 1 is covered, and/or to accommodate for any visual barriers on the deck 71 such as the ladder 74 or other structures.

In the system 10 of FIG. 1, one image sensor 54 is provided at the bow 2 and two image sensors 54 are provided closer to the stern 4. The image sensor 54 at the bow 2 may be configured to cover a 180-degree field of view FOV with a focal distance FD between 0 and 1000 feet, for example. In other examples, the image sensors 54 at the bow 2 has a field of view FOV and focal distance FD so as to capture some of the fishing gear 80 (e.g., the fishing pole 82 nearest the starboard side 8 in a first position P1 as shown in FIG. 6). The two image sensors 54 closer to the stern 4 are shown coupled to the tower 72. In this placement, the fields of view for the image sensors 54 capture the deck 71 (e.g., the fishing poles 82 of FIG. 3) and/or the areas aft or to the sides of the marine vessel 1 that are typically fished (e.g., the planar boards 90 of FIG. 3). In certain embodiments, each of the image sensors 54 coupled to the tower 72 face the stern 4 and have fields of view FOV between 120 and 270 degrees and focal distances between 0 and 500 feet. In certain embodiments, a narrower field of view FOV (e.g., 50 degrees) may be used for longer focal distances.

In certain configurations, a wireless device 300 may be configured to communicate with the control system 100 to act as part of the system 10. The wireless device 300 may be a smartphone having a built-in camera, which may be utilized as one of the image sensors 54 described in the present application (alone, or in combination with other image sensors 54 aboard the marine vessel 1). The wireless device 300 may also have built-in LIDAR for providing depth approximation and generating point clouds. The wireless device 300 may communicate imaging data (also referred to as simply images) from its image sensor 54 wirelessly with the control system 100 using conventional protocols (e.g., Bluetooth®, Wi-Fi, NFC) and corresponding hardware associated with the wireless device 300 and the I/O system 130 of the control system 100. The wireless device 300 may execute an application stored in onboard memory to control the collection of information and imaging data, use of the wireless device 300 generally, and/or to configure the wireless device 300 to operate as part of the system 10.

In addition to providing additional information in the form of images and/or videos, the wireless device 300 may also be used for providing information to the system 10 the form of text, verbal command, and/or the like using conventional techniques. For example, the user may provide additional information relating to the fishing gear, such as selecting a particular pattern for the preset positions to position multiple planar boards, to input a type or specific identify of a lure being used with a certain fishing pole and/or at a certain position among a multiple fishing poles, a type of bait being used, and/or other details provided by the user. The wireless device 300 may also be used to provide additional information relating to the person fishing or a particular fish that has been caught. For example, the user may use the wireless device 300 to manually indicate that a fish has been caught, and also to input size and weight information for that fish. In certain embodiments, the wireless device 300 provides some of the functions of the control system 100 relating to determining the characteristics of a fish (e.g., length, girth, weight) discussed below, such as by using onboard processors, memory, and the like similar to the control system 100 shown in FIG. 2.

In addition to serving as an input device 199 to the system 10 (see FIG. 2), the wireless device 300 may serve as an output device 101. By way of example, a touchscreen display on the wireless device 300 (as is conventional for a smartphone) may be used for displaying various outputs of the system 10.

The data from the image sensors 54 is provided as an input to one or more image processors 53 that process the data to that generate an image, make comparisons with previously generated images, identify patterns in the data or images, and/or detect objects within the data or images. In certain examples, the image processors 53, or the control system 100 more generally, incorporates edge detection technology, computer vision machine learning (CVML), and/or an artificial neural network trained to detect patterns or predefined objects. A library of images pre-classified as corresponding to particular objects (e.g., a deck, different types of lures, different shapes of fish, the wake generated by a marine vessel, water, or the flag of a planar board) may be used for training or for the image processor 53, and/or as a reference for comparing to the data from the image sensors 54. The library may also include these objects in different states, such as planar boards 90 with the flags 94 up and with the flags 94 down, labeled accordingly for subsequent reference.

With continued reference to FIG. 1, the control system 100 may also incorporate information relating to the size, shape, or color of features captured by the image sensors 54 to detect an object. For example, determining that an object of interest is brown makes that object more likely to be water rather than a flag 94 of a planar board 90, which is designed to be visually stand out from the water. In other embodiments, computer vision techniques are used to compare images from the image sensors 54 to each other and/or to pre-classified examples stored in the memory system 120. In certain embodiments, the CVML is used to extract features from the images, whereby models are then used to identify whether certain features exist in the images.

The control system 100 is particularly configured to analyze the images captured from the image sensors to detect fishing gear 80, such as fishing poles 82, lures 84, line 86, planar boards 90 (and the body 92 and flag 94 thereof), and further to detect fishing activity based on the images of that fishing gear 80, as discussed further below. The control system 100 may also be configured to detect other objects such as water, waves, the wake of a propulsor, features of the marine vessel 1 (e.g., the walls of the hull, propulsors, or fishing pole holders), other marine vessels, different fish or other catches that may be caught from fishing aboard the marine vessel, key landmarks (e.g., land formations, the horizon), people, a boat slip, buoys, a shoreline, large rocks, or a tree. In addition to detecting the presence of an object, the control system 100 also detects additional attributes relating to the object, including:

- the location, direction, velocity, and/or acceleration of the object relative to the marine vessel 1 (e.g., relative to the latitudinal axis LAT, longitudinal axis LON, and/or vertical axis VER, which may be based on distances calculated from the image sensor 54 data);
- a type of the object (e.g. a fishing pole 82 versus a lure 84, or a spinning lure 84 versus other types of lure 84, which may be based on the outputs of an artificial neural network or comparison to examples stored in the memory system 120);
- a specific identity of the object (e.g., one particular model of lure 84 versus another, a red fishing pole 82 versus a blue fishing pole 82, a color of the planar board, or a fishing pole 82 with a particular QR code, which may be based on comparison to examples stored in the memory system 120 and/or scanning the QR code via the image sensors 54); and/or
- a status of the object (e.g., "fishing" if the lure 84 is at least 5 feet from the fishing pole 82 and/or the planar board 90 is outside the marine vessel 1—otherwise being "inactive", "fish detected" if the flag 94 of the planar board 90 is down, or "fish detected" if one planar board 90 is moving aftwardly more than other planar boards 90 by a given threshold, such as 10% greater aftward movement over a given time period, for example 2 minutes).

Additional information and examples regarding these attributes are now provided. The location of the object (also sometimes referred to as the position thereof) may be determined by identifying in which of a series of preset positions stored in memory the object is positioned, such as the fishing poles 82 and/or planar boards 90 being in one of the positions P1 through P6 shown in FIG. 6. The positions may be defined as being within the marine vessel, outside the marine vessel, or both, as shown for the first position P1. In this manner, any fishing gear 80 detected within a given position may be automatically associated with each other, such as automatically pairing a fishing pole 82 identified inside the marine vessel 1 with a planar board 90 identified outside the marine vessel 1 when both are within the region defined by that position. In certain embodiments, the control system 100 is configured to automatically adjust the size and shape of these positions based on the speed, steering angle, and/or other control aspects of the marine vessel 1.

It should be recognized that the existence and attributes of objects may also or alternatively be obtained via manual entry by the operator. For example, the operator may use the multi-functional display device 62 at the helm 60 to input that a fishing pole 82 having ID number 123 is in the third position P3 and is using a spinning lure 84. In another example, the control system 100 receives verbal commands from the operator that identify the location of a fishing pole 82 and/or lure 84.

To determine the status of an object, the control system 100 may analyze the object relative to itself, and/or analyze the object relative to another object (e.g., relative to the marine vessel 1). Moreover, this determination may be based on a single image, and/or on changes in the images over time, such as comparing a current image with the previously captured image of that image sensor 54. In one example of an object being compared to itself, the control system 100 detects fishing activity by determining that the flag 94 of the planar board 90 or has moved to a down position. A "fish on" state may also be identified for the fishing gear 80 associated therewith by detecting that the flag 94 of a planar board 90 is down. However, it should be recognized that not all detected fishing activity needs to constitute a "fish on" state. For example, the system 10 may be configured such that a slight bend in a fishing pole constitutes fishing activity, but is not enough of a bend to constitute a "fish on" state (e.g., having seaweed on the line).

In other examples, such as when the flag 94 fails to drop or a fish is too small to cause the flag 94 to drop, the control system 100 may detect the fish by identifying whether (and how far) a fishing pole 82 is bent as compared to forming a straight line. With reference to FIG. 1, the control system 100 may identify an orientation of the fishing pole 82 by detecting its reel 97, then determining a first angle 95 (in all three dimensions) at which the fishing pole 82 below the reel 97 is angled relative to the vertical axis VER, longitudinal axis LON, and latitudinal axis LAT. The portion of the fishing pole 82 up to the reel 97, which is the portion supported within a fishing pole holder on the marine vessel 1, represents a non-bent angle of the fishing pole 82 (which may also be referred to as defining a fishing pole axis).

The control system 100 then determines a second angle 96 (in all three dimensions) at which the fishing pole 82 is bent above the reel 97, here relative to the first angle 95. The second angle 96 of the fishing pole 82 above the reel 97 represent the bent angle of the fishing pole 82, which increases as the drag and/or weight on the line 86 increases (e.g., when a fish is on). In this manner, the control system 100 may determine that a given fishing pole 82 has a "fish on" status when the second angle 96 exceeds a threshold corresponding to a fish being on the line 86 (e.g., at least 15 degrees in any dimension), and/or that the second angle 96 has changed by more than a threshold (e.g., at least a running average of 10 degrees in any dimension for at least 5 seconds). In one example, object tracking techniques are used to monitor one or more eyelets of the fishing pole 82. In another example, machine learning is used to monitor for various features of interest, such as those indicative of having a fish on the line, "bottom bouncing," weeds being caught on the lure 84, and/or the like.

It should be recognized that the thresholds provided herein are merely examples and may vary based on the particular fishing gear 80, for example based on the flexibility of a given fishing pole 82, the weight of a lure 84, and/or the drag of a planar board 90, each of which may be stored in a lookup table for reference. Further, thresholds need not be provided or stored as numeric values. For example, the system 10 may be trained with (or compare captured images with) examples of images showing the fishing pole positioned in a manner considered to constitute fishing activity (e.g., being bent a particular amount, having a particular curve, and/or specific points of the pole being in certain positions and/or moving across images), as well as images of the fishing pole positioned in a manner that does not constitute fishing activity. In other words, the system 10 may analyze the images of the fishing gear to determine whether the fishing gear looks like fishing gear considered to designate fishing activity, or looks like fishing gear known to not be considered fishing activity. As discussed above, this training and/or image analysis may be performed using conventionally known image analysis techniques.

The control system 100 may also assign statuses other than "fish on" and "fish off". For example, the control system 100 may reference the first angle 95 and second angle 96 in conjunction with other information to further determine an expected size of fish on the line (e.g., "Large fish on" or "10-20 pound fish on"), that a small fish, weeds, or debris are on the line, or that bottom bouncing is occurring. In another example, the pixel containing the top of the fishing pole 82 is monitored over time. In this case, the top of the fishing pole 82 is highest when nothing is on the line; therefore, bending is determined by subsequently identifying the top of the fishing pole 82 in a lower pixel within the image. Examples of other information that may be referenced by the control system 100 include marine vessel velocity, marine vessel heading, or a wave direction as detected via data for the image sensors 54.

The control system 100 may further determine a statistical probability of the status being correct based on empirically derived data stored in the memory system 120 of FIG. 2 (e.g., a lookup table). In this manner, the greater the second angle 96, the more likely that the status of "fish on" provided by the control system 100 is correct. Changes in the second angle 96 over time may also indicate a greater probability of a fish being on the line due to the fish swimming. By way of example, this may be determined by identifying that the second angle 96 has changed by at least 10 degrees at least 3 times in any dimension within one minute, or the second angle 96 changing at an average rate of 2 degrees per second in any dimension for at least 10 seconds.

With reference to FIG. 1, the accuracy of determining angles along all three axes may be improved by mounting the image sensors 54 at different heights of the deck 71. Likewise, the need for determining the angles along multiple axes may depend upon the setup of the fishing gear 80. For example, a fishing pole 82 positioned in the marine vessel 1 so as to angle both aftwardly and latitudinally outwardly from the marine vessel 1 may require the determination of angles in more dimensions than a fishing pole 82 oriented with the first angle 95 running in the vertical axis VER with the heading directly aftwardly.

In certain other embodiments, the data from the image sensors 54 is compared, via image analysis techniques, to stored images designated as "fish on" (e.g., images of fishing poles 82 with second angles 96 exceeding 15 degrees) and "fish off" (images with second angles less than 15 degrees) to determine the status of a fishing pole 82. Statistical probabilities may again be provided based the detected difference between the image or the fishing pole 82 and the stored images.

The control system 100 may also incorporate the speed of the marine vessel 1, determined via one of the techniques discussed above, to determine how much of the second angle 96 is attributable to the propulsion of the marine vessel 1 in water, versus being attributable to a fish on the line. This attribution may be based on lookup tables stored in the memory system 120, and/or learned over time via machine learning within the control system 100.

As an example of determining the status of an object by comparing the object to another detected object, the second angle 96 of one fishing pole 82 may be compared to the second angle 96 of another fishing pole 82. In this case, the impacts of the planar board 90, marine vessel velocity, etc. would be expected to impact both fishing poles 82 similarly. Therefore, a difference between the second angles 96 that exceeds a threshold (e.g., threshold of 10 degrees in any dimension) may indicate a status of "fish on" for the fishing pole 82 with the greater second angle 96. Similar behavior may also be observed when steering the marine vessel 1, whereby it would be recognized that the lures 84 associated with inner fishing poles 82 would go slower than those of the outside fishing poles 82.

The present inventors have recognized that when fishing gear 80 is moved or switch (e.g., one fishing pole 82 is reeled in or removed from service), the sequence of the fishing poles 82 across the positions, and other fishing gear 80 associated therewith, is often changed. In an effort to avoid tangling the lines, fishing poles 82 are often started closest to the center of the marine vessel 1 (e.g., positions P3 and P4), then moved laterally outwardly moved as new poles are introduced (e.g., position P2 to position P1, then position P3 to position P2 to enable a newly set pole to be introduced at position P3). As discussed above, tracking these changes further complicates the process of tracking the use and success rate of individual pieces of the fishing gear 80 over time.

The system 10 is configured to automatically detect the movement of a given piece of fishing gear 80 from one location to another, for example the fishing pole 82 and associated lure 84 moving from a fifth position P5 to a fourth position P4 (FIG. 6). The different pieces of fishing gear 80 may be tracked via association, specifically by inferring the location of an object such as a lure 84 based on the detected location of the fishing pole 82 to which it has been assigned. This association may have previously been automatically detected and/or manually inputted by the operator. For example, the operator may select a particular lure 84 from a dropdown list for a given fishing pole 82 in the multi-functional display device 62, give voice commands "Hey boat-assign lure A to position 1", or click an "acquire"

button causing the image sensors 54 to acquire images of the lure 84 to automate this inputting process. The system 10 may also be configured to detect when lines have been inadvertently crossed, such as by comparing that axes of two fishing poles to the lines extending therefrom.

In certain embodiments, the control system 100 uses the multiple viewing angles provided by multiple image sensors 54 to track the movement of the fishing gear 80 anywhere within the fields of view. For example, the reel 97 of each fishing pole 82 may be tracked as a three-dimensional point in space, then relying on the associations between the fishing pole 82 and other fishing gear 80 (e.g., lures 84) to correspondingly track the movement of these other pieces of fishing gear 80.

In other embodiments, the individual fishing poles 82 can be distinctly identified from each other (e.g., different colors, barcodes, and/or the like) such the control system 100 need only detect which fishing poles 82 are in each of the predefined positions (e.g., first position P1 through sixth position P6) at any given instant or on a periodic basis (e.g., every 10 seconds). In further embodiments, different colors of planar boards 90 are used to aid in distinguishing them from each other.

In this manner, the system 10 uses the output from the image processor 53 to detect fishing activity for the fishing gear 80 based on the detected fishing gear 80 and/or any changes to the detected fishing gear 80 over time. For example, the system 10 may detect that a fish is on the line by identifying that one of the planar boards 90 slowly drifting aftwardly and can detect this much earlier than the operator could discern, and without requiring the operator's attention. For example, the system 10 may determine that a fish is on the line if a planar board that is assigned to a preset position (e.g., position P1) has an actual position that is different from that preset position. Different thresholds may also be used before determining that a difference between the actual and preset position shall be deemed fishing activity. By way of example, the system 10 may be configured to detect fishing activity when the actual position is at least 5 feet from a preset position, from an outline of a preset position that covers a range, or 15% farther from the marine vessel than the preset position.

In another example, the system 10 determines that a fish is on the line if a planar board is no longer at the angle relative to the marine vessel expected for its preset position. For example, FIG. 6 shows multiple planar boards connected to the marine vessel via lines extending at approximately the same angle relative to the marine vessel. If a given planar board deviates from this angle by at least a threshold angle (e.g., 5, 10, or 20 degrees), the system 10 may determine that a fish is likely to be on that line, or that another issue is causing the line to drift.

In similar examples, the system 10 may approximate a line that roughly extend through multiple planar boards on a given side of the marine vessel for a given setup (e.g., the three planar boards on the starboard side in FIG. 6). If any of the planar boards devices from this imaginary line (e.g., by more than a threshold distance and/or angle), that planar board may be determined to have a fish on the line or another issue causing it to drift.

In a further example, the system 10 calculates a velocity of the planar board and a velocity of the marine vessel. The two velocities are then compared, which may be a simple subtraction. If the velocity of the planar board is less than the marine vessel (which should typically be the same), the system 10 determines that a fish may be on that line.

The system 10 further includes one or more notification devices configured to alert or notify the operator of this detected fishing activity using displays, sounds, haptics, and/or the like. In certain embodiments, the system 10 generates an indication on the multi-functional display device 62 at the helm 60, specifically identifying which fishing gear 80 has fishing activity, such as the fishing pole 82 in a first position P1. The indication on the multi-functional display device 62 may also show the particular lure 84 that was last identified as corresponding to that fishing pole 82. By way of example, the notification devices may also or alternatively include other types of display devices (e.g., monitors, LEDs or other lights emitters, etc.), speakers, haptic feedback vibration motors, and/or external devices such as smartphones or smart watches (themselves having the capability to produce visual, auditory, or other sensory notifications for the user).

The system 10 may also determine a projected size, weight, and/or type of fish based on the second angle 96 of the fishing pole 82, images of the fish collected via the image sensors 54 and measurements determined therefrom (discussed further below), the amount of movement of the lure 84 in the water compared to other nearby lures 84, and/or the type of lure 84 and bait being used (e.g., based on associations between lures and bait and the type, size, and weight of fish typically attracted thereto, as stored in a lookup table). The multi-functional display device 62 may also show a name or photo of a client inputted by the operator as being associated with that fishing pole 82. The fishing activity may further be stored for future reference, as discussed further below. In another embodiment, an audible alert is given through speakers in an audio-visual system at the helm 60. For example, the audible alert may say "Fish on, first position!" Additional indications provided by the system 10 may include text messages to a smart phone, vibrations and/or messages on a smart watch, and/or selectively illuminating lights at the fishing pole holder corresponding to the fishing pole 82 with the fish on status.

The system 10 may also be configured to continue monitoring the fishing gear 80 after a fish is ultimately landed. This includes detecting that a fish was actually caught, versus seaweed or other debris, which may be incorporated to modify future detection routines via machine learning. The fishing gear 80 used to land the fish may also be automatically stored in the memory system 120 (FIG. 2) to generate trends over time. In this manner, the control system 100 can automatically track which lure 84 is most effective as a function of the position and type of the fishing pole 82, bait, fishing depth, time of day, date, velocity of the marine vessel 1, GPS location, the use of a planar board 90, air temperature, water temperature, wind direction, wind speed, and/or other variables. As discussed above, some of this information may be provided via manually input data, and/or the operator may have the opportunity to confirm the detection accuracy of any automatically detected fishing gear 80.

Figure 11:
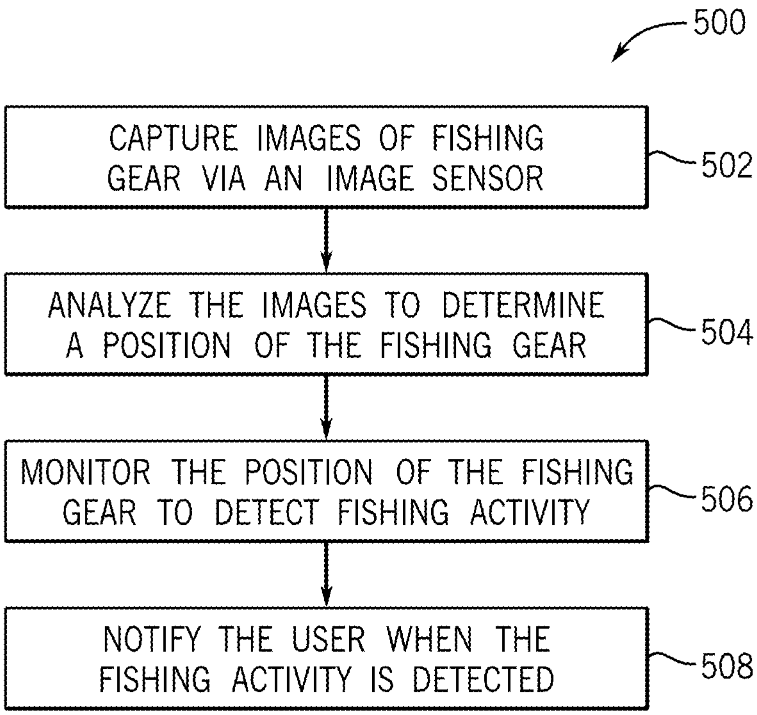
FIG. 11 shows an example of a method according to the present disclosure for assisting a user fishing with fishing gear.

FIG. 11 illustrates one method 500 for assisting a user fishing with fishing gear, such as through use of the components described above. Step 502 provides for capturing images of the fishing gear via one or more image sensors, which are analyzed in step 504 to determine a position of the fishing gear. As discussed above, the position of the fishing gear may be relative to itself (e.g., the bend of a fishing pole) and/or relative to other objects (e.g., being inside or outside a marine vessel, a distance from the stern of the marine vessel, etc.). The position of the fishing gear is monitored in step 506 to detect fishing activity based on position of the fishing gear. As discussed above, this detection may be based on the position of the fishing gear itself, and/or based on changes in the position of the fishing gear. For example, a flag of a planar board being in a down position may indicate fishing activity alone. In another example, a distance between a planar board and the marine vessel may indicate fishing activity if this distance differs from the preset position expected for that planar board by a threshold among. Alternatively, a change in the distance over time between the planar board and the marine vessel may also indicate fishing activity. In each case, the position of the planar board may be indicative of a fishing being on the line, thus constituting fishing activity for which the user shall be notified (step 508).

The system 10 may also be configured to solve further problems that the present inventors have identified within the fishing world. In particular, a typical procedure after landing a fish is manually measuring the fish from tip to tail, then hanging the fish on a spring scale to measure its weight. It is often challenging to obtain an accurate measurement of the fish, particularly when required to place the fish down on the deck rather than holding it up. Additionally, there is a possibility that inserting the hook of the spring scale, and/or the act of suspending the fish from the spring scale to take the measurement, will cause injury to the fish. In a sport in which catch and release is a common practice, this is an unfortunately additional risk for the fish.

It should also be recognized that in certain cases it will be determined that the fish is not of appropriate size to keep (and/or is not a legal catch), whereby releasing the catch is not discretionary and accidental injury is further problematic. In certain embodiments, the system 10 is configured so as to warn the operator when a catch is not legal, also coaching them to release the fish. This determination may be made through comparison to another lookup table showing the legal limits by species, whereby the species determination may be made automatically as described herein, entered manually, and/or combinations of the two (e.g., requesting that the operator confirm the automatically determined species). This determination may also be made using GPS information to determine the particular lake being fished, allowing for consideration of regional or lake-specific restrictions regarding size limits for each species. In certain embodiments, the system 10 may also identify if a species is considered invasive, flagging the operator to not release the catch and/or providing this information to regulatory agencies.

In addition, the act of measuring and weighing the catch also takes time, and is further time in which the fish is out of the water and unable to breathe.

In view of this, the present inventors have developed the systems 10 and methods disclosed herein so as to be able to detect the type, size, and estimated weight of a fish brought onboard, which may also be stored in memory. The type, size, and weight of the fish may be determined by comparison of the images acquired from the image sensors 54 to examples stored in memory and/or by other techniques described above for detecting objects and attributes thereof. In certain embodiments, the type, size, and weight are also or alternatively determined based on calculated distances between the head and tail, between the back and the underside, between the sides, and/or between different features of the fish (e.g., specific fins, gills, the mouth) using the data from the image sensors 54 as discussed above. The fish may also be compared to other objects determined to be nearby (e.g., a known height of the fishing pole 82).

These calculated distances may be measured directly from stereo-vision configurations of image sensors 54 to determine the length, girth, species, and estimated weight of the fish. In particular, the imaging data from two or more image sensors 54 is analyzed to identify the same object or feature (e.g., the top-most point of a fish relative to background) within the images (which may be 2-dimensional images). The image sensors 54 are separated from each other by a distance, also known as the disparity between the image sensors 54. In view of this, the imaging data collected by the image sensors 54 can further be compared to determine the distance (or depth) to the object or feature via triangulation, a process also known as disparity mapping. In this manner, the 3-dimensional location of the object or feature can be determined relative to the image sensors 54.

The present inventors have recognized that by determining the 3-dimensional locations of key points of a fish, such as the tip of the nose and the tip of the tail, measurements of the fish can be taken by calculating the differences between these points (here, length). Other measurements can also be determined, for example determining girth by comparing the 3-dimensional locations between the back and the underside of the fish, as discussed further below. The depth information obtained from comparing the imaging data of multiple image sensors 54 is advantageous for scaling the measurement determined between the key points of the fish based on how far the fish was from the imaging sensors 54 when imaged. In other words, the same fish will appear much larger if imaged from 2 feet away than if imaged from 10 feet away. In this manner, stereo-vision ensures accurate measurements of the fish by accounting for this variable.

Figure 10:
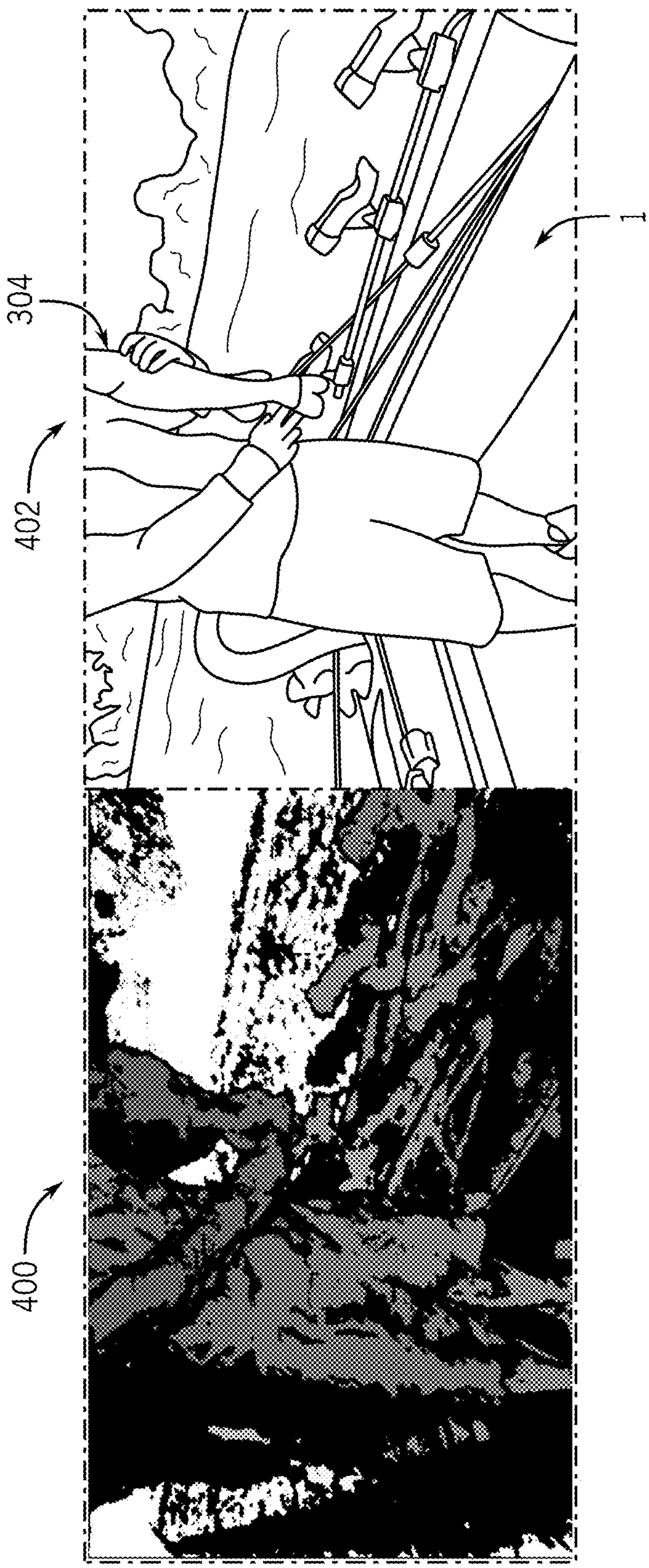
FIG. 10 shows an example of imaging information captured from a stereo-vision camera according to the present disclosure.

The present inventors have further recognized that, since it is advantageous to increase the disparity between the image sensors 54 (i.e., improving the ability to determine accurate 3-dimensional locations within the corresponding imaging data), it may be advantageous to position the image sensors 54 farther apart on the marine vessel (e.g., 3 feet or more apart near opposite sides of the tower 72 of FIG. 1, versus a single package stereo-vision camera). It can be further advantageous to position the different image sensors 54 at different vertical positions on the marine vessel to provide disparity in the vertical dimension. Disparity in the vertical direction can be helpful for accurately determining the length of the fish since the fish is typically held vertically (i.e., the nose above the tail) during measurement. FIG. 10 shows one example of imaging data 400 collected from a stereo-vision camera (left) next to the corresponding standard 2-dimensional photo 402 (right) of the same person and fish to be measured.

In this manner stereo-vision image analysis can be used to determine measurements for a fish or other catch aboard a marine vessel. It should be recognized that other methods and technologies for identifying the 3-dimensional positions of key points on the fish of may also be used to achieve this function. By way of example, LiDAR or other Time-of-Flight technologies may be used to determine the 3-dimensional positions of the key points for calculating measurements.

It should be recognized that while the present disclosure largely discusses systems in which imaging data from multiple image sensors 54 is used for determining measurements of the fish, a single image sensor may also be used. For example, length and girth measurements may be calculated using a single 2-dimensional image of the fish. In view of the scaling discussion provided above, the accuracy of this technique may be improved by incorporating other mechanisms for determining the distance between the imaging device 54 and the fish. By way of example, this may be provided via LiDAR, or by requiring images to be captured from a known distance (e.g., marked by a sticker on the deck of the boat). The present inventors have further recognized that scale can also be obtained via other means, such as incorporating an object of known size near the fish within the image. For example, a decal of known length could be provided on the vessel where the fish is to be positioned for imaging (e.g., an AprilTag™ or a branded logo of known size). In another embodiment, the operator may pre-enter a measurement for a fixed portion of the vessel within the vicinity in which the fish will be imaged, such as a height of the transom extending above the rear deck.

Figure 8:
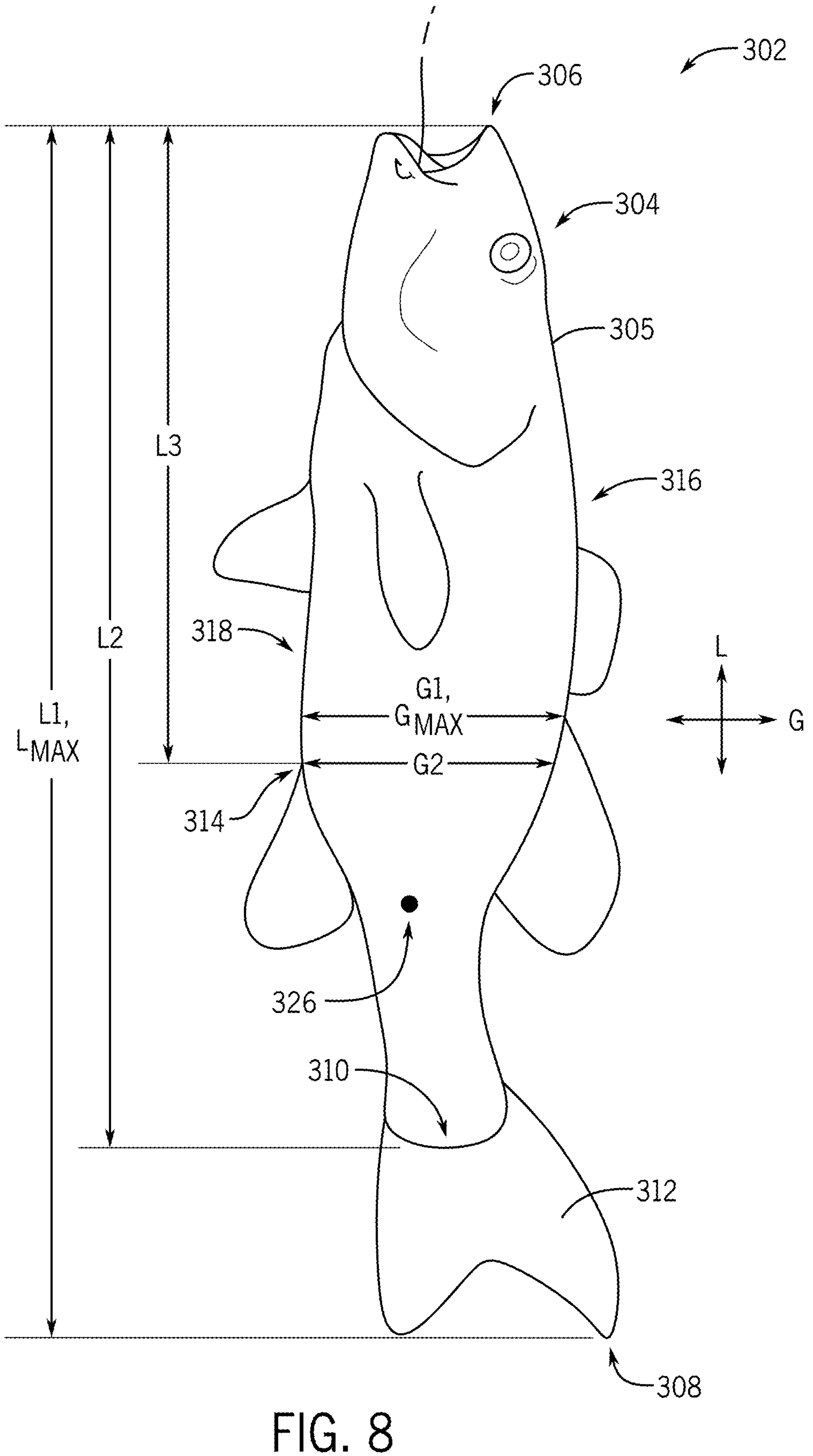
FIG. 8 depicts characteristics of a fish determined based on imaging data generated for the fish.

FIG. 8 shows an example of an image 302 generated from the imaging data collected by the image sensors 54 discussed above, and examples of characteristics of a fish 304 that can be determined by the system 10. The image 302 includes the fish 304, which may be identified within the image using techniques described above. By way of example, these techniques may include edge detection and comparison to objects in models that are classified as corresponding to fish. These models, which may be stored in the memory system 120 discussed above (see FIG. 2), may include multiple different fish having different general shapes 305. FIG. 8 further shows a length L and width or girth G (perpendicular to the length L) determined for the fish 304. The length L may be determined at multiple locations (in other words, at different positions along the girth G). The image 302 of FIG. 8 shows a first length L1 defined between the tip 306 of the head and the tail 308. Other lengths may also be determined, including a second length L2 defined as extending between the tip 306 and the end of the body 310 (i.e., excluding the tail fin 312), and a third length L3 defined as extending between the tip 306 and another landmark, such as the forward end of another fin 314.

Similarly, the image 302 shows two examples of girths G determined between a back 316 and an underside 318 of the fish 304. In particular, FIG. 8 shows a first girth G1 corresponding to the maximum gift Gmax of the fish 304, as well as a second girth G2 between the back 316 and the underside 318 at the third length L3. Likewise, the length L, the girth G may be determined at multiple locations along the length L. It should be recognized that these length L and girth G measurements are merely examples. The present inventors have further recognized that increasing the number of length L and girth G determinations, and likewise cross-referencing these measurements in relation to each other, further improves the characterization of the shape 305 of the fish 304, and thus the ability to accurately match the fish 304 to those include in the models.

The measurements discussed above can then be used to estimate further characteristics of the fish 304, such as weight, based on comparisons and references to lookup tables stored in memory (which may be empirically derived). The shape of the fish 304, the maximum length Lmax, and the maximum girth Gmax are then processed by the control system 100 to determine an estimated weight for the fish 304. The same length L and girth G for a shape 305 corresponding to a "pan fish" type fish may be attributed to a lesser weight than for a shape 305 corresponding to a bass, for example, as pan fish typically do not have much thickness (perpendicular to the length L and girth G). In certain examples, the fish 304 may also be rotated (or the image sensors 54 oriented to capture this additional dimension) so as to also measure the thickness rather than predicting thickness based on the overall shape 305, length L, and girth G.

The present inventors have identified further considerations for accurately estimating the weight of the fish 304 without the use of a scale. In certain embodiments, the system 10 also determine the species of the fish 304, which can then be used to reference species-specific models stored in memory for more accurate weight estimates using the measured length L and girth G. By way of example, the species may be determined, or the list of possibilities narrowed, by considering a coloration of the fish 304 as well as the GPS location of the marine vessel 1, water temperature, water clarity and/or color, weather, date, time, recent fishing trends shared over a cloud network, and/or information about lures 84, line lengths, and bait. The system 10 may also consider other information discussed above, such as the angle of the fishing pole while the fish was being landed, or how much the fish fought (e.g., the amount of movement of the lure, line, or planar board detected while catching the fish). These characteristics collectively improve the system 10 ability to accurately identify the species of the fish and, consequently, improve estimated characteristics such as weight.

These techniques therefore save the time and effort of manually measuring and weighting the fish once landed in the marine vessel, while also limiting the risk of injury to the fish and the duration in which the fish must be out of the water to accurately archive its existence.

The present inventors have identified further functions and features that can be offered using the systems 10 and methods described herein. For example, the characteristics determined for each fish caught can be used to create a digital representation of the fish to be kept in a virtual "live well," serving as a record of all fish brought onboard. In addition to the determined attributes of type, size, and weight (which may be confirmed or overwritten manually by the user), the live well may include a photograph of the actual fish as captured by the image sensors 54, and/or a graphic rendition thereof. This virtual well provides a record-keeping replacement for operators whether keeping the fish or engaging in catch and release. The system 10 may also be configured to make recommendations for how to maintain the live well as a function of the type, size, and quantity of fish kept therein. For example, certain species or an increasing number of fish kept in the live well may automatically increase the operation of an aerator or adjust the temperature of the water in the live well.

Figure 9:
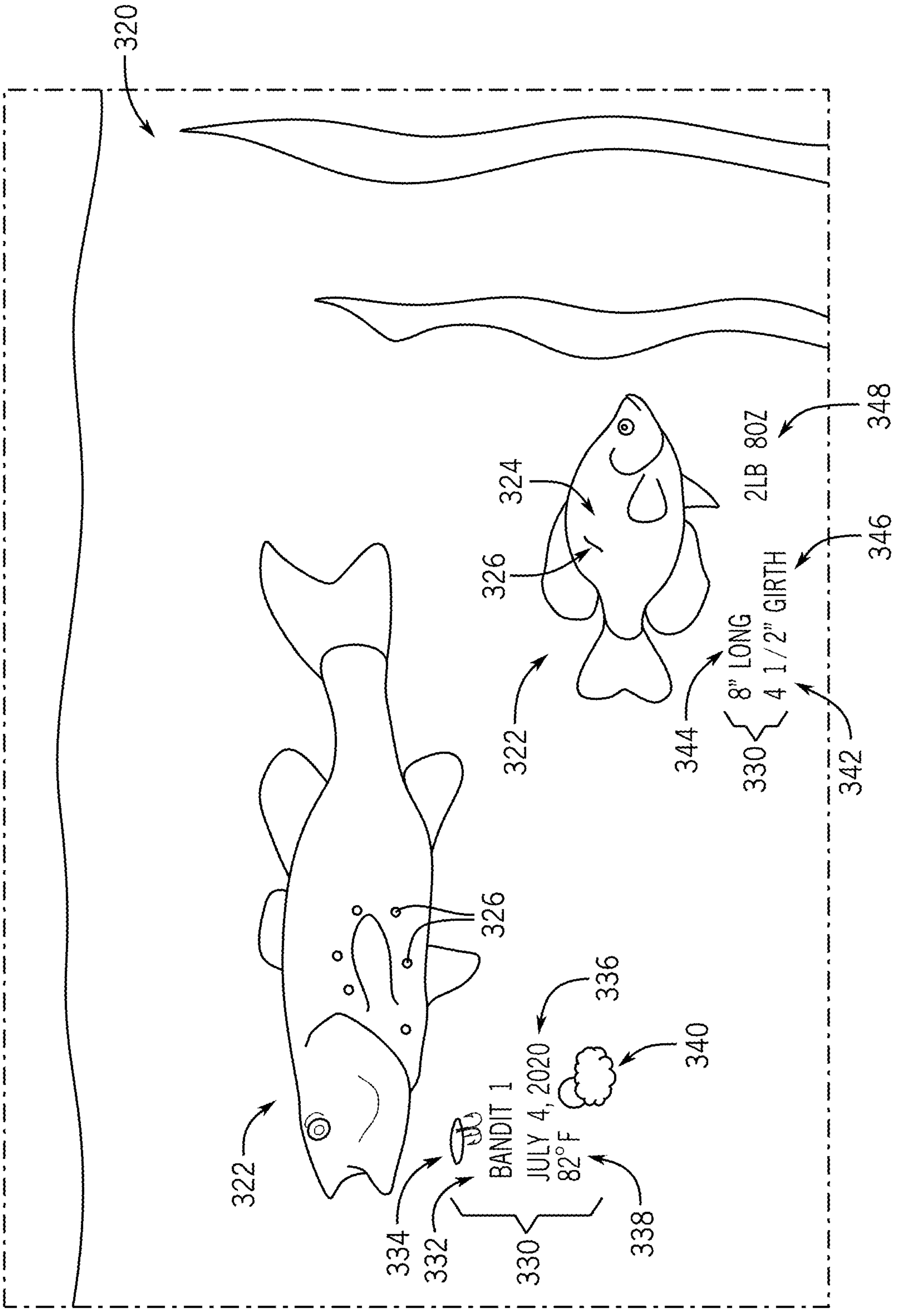
FIG. 9 shows a virtual aquarium depicting digital representations of fish caught in the marine vessel.

These catches can also be kept long term in a virtual aquarium not only of the fish in the marine vessel's live well, but of any fish caught by the operator over time. FIG. 9 shows an example of a virtual aquarium 320 providing a digital representation 322 of each fish 304 stored in memory (e.g., as metadata). The digital representations 322 may be shown to scale based on the measurements described above, and also shown with the coloration 324 and any markings 326 identified from the imaging data of the image sensors 54 as discussed above. The digital representations 322 may also be shown swimming as if in a real aquarium. This allows the operator to achieve any catches of interest and be able to see near-identical replicas thereof without the need for taxidermy.

Additional information 330 may also be provided alongside each digital representation 322, which may be customizable and may also be selectively shown (e.g., by hovering over the digital representation 322). A first example 332 of additional information 330 is shown having a digital representation 334 of the lure used to catch the fish, along with its name, as well as the date 336, ambient air temperature 338, and weather 340 at the time. In a second example 342, the additional information 330 includes the length 344, the girth 346, and the estimated weight 348 using one of the techniques described above. Other characteristics may be shown in place of, or in addition to, the examples shown in FIG. 9. Likewise, the operator may add and delete which fish are kept in the virtual aquarium 320, for example keeping only the largest and most memorable catches as time goes on.

The present inventors have further recognized that where the system 10 is interconnected with systems 10 of other marine vessels 1, information can be shared and compared to conduct a virtual fishing tournament. In this manner, people may participate in the tournament regardless of their location, no longer being required to be physically near each other for measurement and comparison of catches. This live well data may be stored on the marine vessel 1 and/or transmitted to a smart phone for sharing. The present inventors have identified that fairness, and thus fun, in conducting a virtual fishing tournament are improved by the systems 10 and methods disclosed herein in that the system 10 can be configured such that measuring and weighing are not subject to human error or manipulation (i.e., cannot be overridden manually, or not without other safeguards such as video-recorded measurements to corroborate or replace estimated weights).

Figure 7:
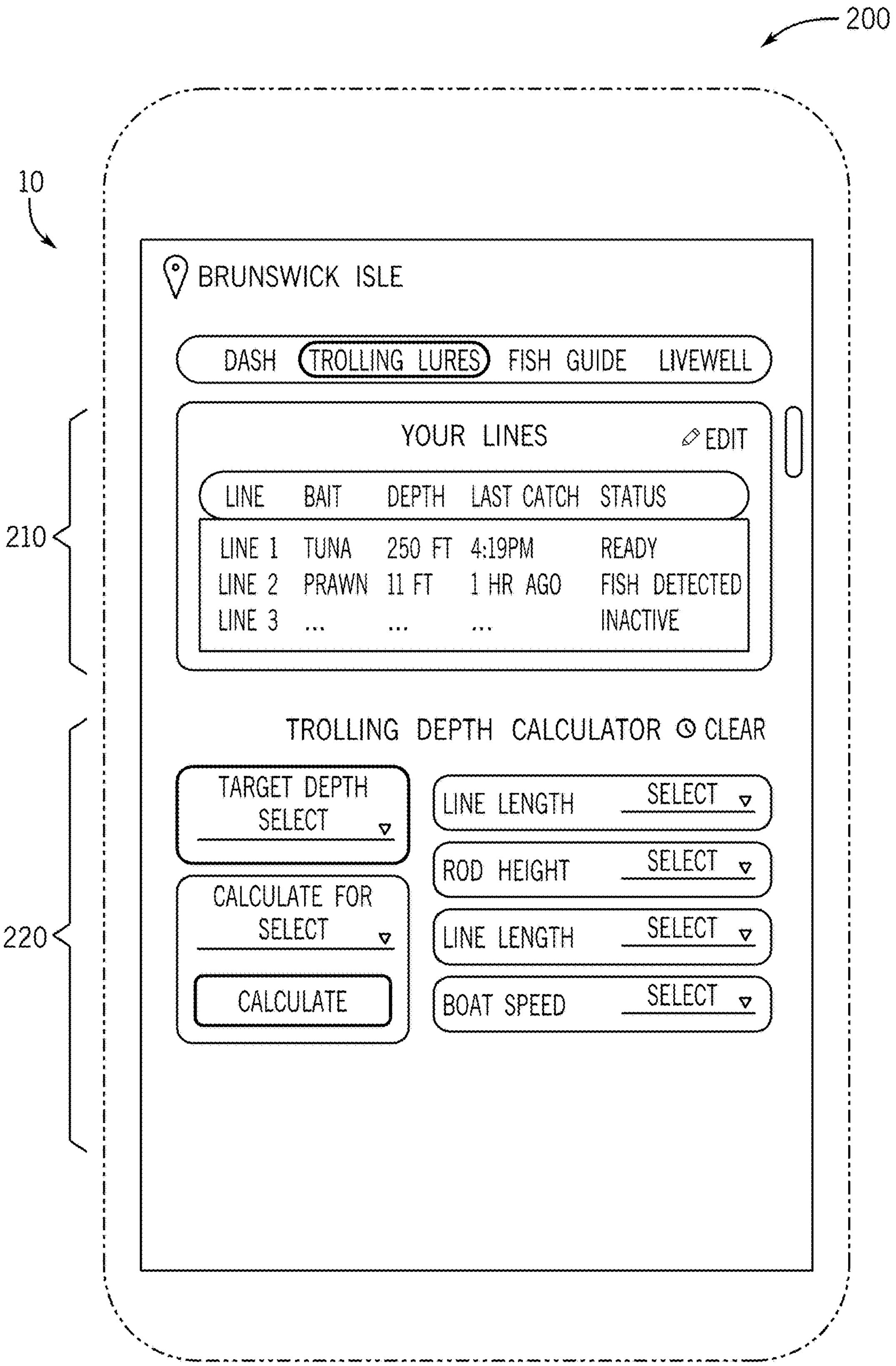
FIG. 7 shows one example of a display for displaying fishing activity according to the present disclosure

FIG. 7 shows one example of a fishing management program 200 displayed on the multi-functional display device 62 by the control system 100 according to the present disclosure. The program 200 may be stored in the memory system 120 of FIG. 2. The program 200 may be used to input different characteristics of the fishing gear 80 in the system 10, to aid in the deployment of fishing gear 80, and to display the status of the currently deployed fishing gear 80. A "Your Lines" chart 210 shows, for each of the "lines" (e.g., fishing poles 82), the current lure 84 and/or bait, the depth of the lines 86, 87, the time of the last catch on that line, and the status of that line (e.g., ready, fish detected, or inactive). This chart 210 is automatically updated as fishing activity is detected or fishing poles 82 move places, as described above.

The program 200 of FIG. 7 further shows a trolling depth calculator 220, which may be selectively displayed on the multi-functional display device 62 by the operator when needed. The calculator 220 includes inputs for the length of the fishing pole 82 (rod length), the length of the line 86 and/or line 87, trolling weight, lure 84 weight, and the speed of the marine vessel 1. It should be recognized that one or more of these variables may be automatically entered by the system (e.g., based on a detected velocity from GPS) and/or pre-populated from historic selections saved in the program 200 (e.g., similar to the Rapala Depth Chart published by Rapala VMC Corporation of Helsinki, Finland).

In this manner, the presently disclosed systems and methods improve the safety and effectiveness of fishing from a marine vessel 1, namely by automatically detecting and displaying fishing activity to aid the operator while busy tending to other tasks.

The functional block diagrams, operational sequences, and flow diagrams provided in the FIGURES are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for assisting a user fishing with fishing gear in a marine vessel, the system comprising:

an image sensor configured to capture imaging data of the fishing gear;

a control system comprising a processing system, wherein the processing system is configured to receive the imaging data from the image sensor and to analyze the imaging data to detect the fishing gear therein, and wherein the control system is configured to determine a position of the fishing gear, and/or a distance to the fishing gear, relative to the marine vessel or relative to an object different than the fishing gear supported by the marine vessel, and to detect whether fishing activity has occurred when a change in the position and/or the distance to the fishing gear exceeds a predetermined threshold; and a notification device operatively coupled to the control system and configured to automatically notify the user when the fishing activity is detected.

2. The system according to claim 1, wherein the image sensor comprises a stereo-vision camera.

3. The system according to claim 1, wherein the image sensor is positioned within the marine vessel, the marine vessel being configured to be situated in water, and wherein the image sensor is configured to capture the imaging data of the fishing gear when the fishing gear is in the water.

4. The system according to claim 3, wherein the image sensor is a first image sensor, further comprising a second image sensor positioned within the marine vessel and configured to capture imaging data of the fishing gear out of the water.

5. The system according to claim 1, wherein the image sensor is configured to detect the distance to the fishing gear.

6. The system according to claim 5, wherein the image sensor comprises a LIDAR device.

7. A system for assisting a user fishing with fishing gear in a marine vessel, the system comprising:

an image sensor configured to capture imaging data of the fishing gear;

a memory system storing preset positions for the fishing gear;

a control system comprising a processing system, wherein the processing system is configured to receive the imaging data from the image sensor and to analyze the imaging data to detect the fishing gear therein, and wherein the control system is configured to determine a position of the fishing gear relative to the marine vessel or an object different than the fishing gear supported by the marine vessel and to compare the position determined for the fishing gear to the preset positions stored in the memory system, wherein whether fishing activity has occurred is determined based on the comparison of the fishing gear to the preset position corresponding thereto; and a notification device operatively coupled to the control system and configured to notify the user when the fishing activity is determined to have occurred.

8. The system according to claim 1, wherein the fishing gear comprises a fishing pole, wherein the control system is configured to analyze the imaging data captured by the image sensor to detect an angle of the fishing pole, wherein the position of the fishing gear comprises the angle of the fishing pole, and wherein the fishing activity is detected when the angle of the fishing pole exceeds a threshold.

9. The system according to claim 1, wherein the control system is configured to communicate with an external wireless device and to receive additional information regarding the fishing gear and/or fish caught with the fishing gear from the external wireless device, wherein the additional information comprises at least one of a type of lure, a preset position for positioning the fishing gear, weather data, water temperature, water clarity, an indication that a fish was caught, and a size of a fish that was caught.

10. A method for assisting a user fishing with fishing gear in a marine vessel, the method comprising:

capturing imaging data of the fishing gear via an image sensor;

analyzing the imaging data via a processing system to identify the fishing gear therein;

determining a position of the fishing gear, and/or a distance to the fishing gear, relative to the marine vessel or to an object different than the fishing gear supported by the marine vessel;

monitoring the position of the fishing gear and/or the distance to the fishing gear to detect changes thereto;

comparing the changes to a predetermined threshold, wherein the changes exceeding a predetermined threshold indicate fishing activity; and automatically notifying the user when the fishing activity is detected.

11. The method according to claim 10, wherein the image sensor is positioned in a marine vessel situated in water, wherein the fishing gear comprises a planar board, and wherein the fishing activity is detected based on the position of the planar board in the water outside the marine vessel.

12. A method for assisting a user fishing with fishing gear, the method comprising:

capturing imaging data of the fishing gear via an image sensor, wherein the fishing gear comprises a planar board having a flag, a fishing pole, or multiple fishing poles;

analyzing the imaging data via a processing system to identify the fishing gear therein;

determining a position of the fishing gear, wherein the position of the fishing gear comprises a position of the flag, an angle in which the fishing pole is bent, or an order in which the multiple fishing poles are arranged, respectively;

detecting whether fishing activity has occurred, wherein the fishing activity is detected based on whether the position of the flag is determined to be down, the angle in which the fishing pole is bent, or whether the order of the multiple fishing poles is determined to change; and automatically notifying the user when the fishing activity is detected.

13. The method according to claim 10, wherein the fishing activity is detected when the distance to the fishing gear is determined to have changed more than the predetermined threshold.

14. The method according to claim 12, wherein the fishing activity is detected when the angle of the fishing pole exceeds a threshold.

15. The method according to claim 10, wherein the position of the fishing gear comprises a position of the fishing gear in water, further comprising comparing the position of the fishing gear in water to a preset position for the fishing gear to be in the water, wherein the fishing activity is detected when the actual position differs from the preset position.

16. The method according to claim 10, wherein the fishing gear comprises a fishing lure, further comprising recording when a fish is caught and the fishing lure used to catch the fish.

17. The method according to claim 10, wherein the fishing gear comprises a plurality of fishing poles arranged in an order, and wherein the fishing activity is detected when the order of the plurality of the fishing poles is determined to have changed.

18. The method according to claim 10, wherein the fishing gear comprises a plurality of fishing poles, further comprising analyzing the imaging data to determine which of the plurality of fishing poles are in-use fishing, and further comprising displaying which of the plurality of fishing poles are in-use fishing.

19. The method according to claim 10, wherein the image sensor comprises a stereo-vision camera positioned within the marine vessel and configured to capture the imaging data of the fishing gear when the fishing gear is outside the marine vessel.

* * * * *